US008054496B1

(12) United States Patent
Rehfeld

(10) Patent No.: US 8,054,496 B1
(45) Date of Patent: Nov. 8, 2011

(54) PREVIEWING A COMPOUND DOCUMENT

(75) Inventor: Martin Rehfeld, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 849 days.

(21) Appl. No.: 11/181,134

(22) Filed: Jul. 13, 2005

(51) Int. Cl.
*G06K 15/00* (2006.01)
*G06F 3/12* (2006.01)
*G06F 17/00* (2006.01)
*G06F 3/048* (2006.01)
*G03F 3/10* (2006.01)

(52) U.S. Cl. ..... 358/1.18; 358/527; 358/1.13; 358/1.15; 715/201; 715/205; 715/209; 715/239; 715/781

(58) Field of Classification Search .................. 358/527, 358/1.12, 1.13, 1.18, 537, 540, 401, 403, 358/442, 448, 209, 210, 215, 221, 223, 234, 358/235, 224, 225, 515, 255, 272, 273, 277; 715/201, 205, 209, 210, 223, 234, 239, 236, 715/255, 273, 274, 277, 751, 764, 771, 781, 715/854, 215, 221, 235, 224, 225, 515, 272, 715/527, 1.12, 1.13, 1.18, 537, 540, 401, 715/403, 442, 448
See application file for complete search history.

(56) References Cited

U.S. PATENT DOCUMENTS

| | | | | | |
|---|---|---|---|---|---|
| 5,634,064 | A | * | 5/1997 | Warnock et al. | 715/208 |
| 5,748,931 | A | * | 5/1998 | Jones et al. | 715/853 |
| 5,838,458 | A | * | 11/1998 | Tsai | 358/402 |
| 6,167,394 | A | * | 12/2000 | Leung et al. | 707/3 |
| 6,249,794 | B1 | * | 6/2001 | Raman | 715/210 |
| 6,268,924 | B1 | * | 7/2001 | Koppolu et al. | 358/1.13 |
| 6,462,756 | B1 | * | 10/2002 | Hansen et al. | 715/764 |
| 6,585,777 | B1 | * | 7/2003 | Ramaley et al. | 715/205 |
| 6,611,349 | B1 | * | 8/2003 | Vogt et al. | 358/1.15 |
| 6,708,309 | B1 | * | 3/2004 | Blumberg | 715/209 |
| 6,715,129 | B1 | * | 3/2004 | Hind et al. | 715/239 |
| 6,938,205 | B1 | * | 8/2005 | Hanson et al. | 715/234 |
| 6,993,527 | B1 | * | 1/2006 | Raman et al. | 715/237 |
| 6,995,860 | B2 | * | 2/2006 | Roztocil et al. | 358/1.18 |
| 7,031,968 | B2 | * | 4/2006 | Kremer et al. | 707/100 |
| 7,111,234 | B2 | * | 9/2006 | Peck et al. | 715/255 |
| 7,114,128 | B2 | * | 9/2006 | Koppolu et al. | 715/781 |
| 7,117,435 | B1 | * | 10/2006 | Kotler et al. | 715/210 |
| 7,168,034 | B2 | * | 1/2007 | Hennings et al. | 715/205 |
| 7,168,035 | B1 | * | 1/2007 | Bell et al. | 715/234 |
| 7,174,504 | B2 | * | 2/2007 | Tsao | 715/255 |
| 7,236,982 | B2 | * | 6/2007 | Zlatanov et al. | 707/102 |
| 7,257,767 | B1 | * | 8/2007 | Carden, Jr. | 715/234 |
| 7,268,896 | B2 | * | 9/2007 | Bellagamba et al. | 358/1.12 |
| 7,281,049 | B2 | * | 10/2007 | Verma et al. | 709/229 |
| 7,296,017 | B2 | * | 11/2007 | Larcheveque et al. | 1/1 |

(Continued)

FOREIGN PATENT DOCUMENTS

WO    WO 9932982 A1 *  7/1999

*Primary Examiner* — Twyler Haskins
*Assistant Examiner* — Jonathan Beckley
(74) *Attorney, Agent, or Firm* — Van Pelt, Yi & James LLP

(57) ABSTRACT

Providing a preview is disclosed. A first document associated with a first application is accessed. The first document is referenced by a second document. A preview is generated in a format capable of being displayed by the first application. The preview is provided for display by the first application.

25 Claims, 5 Drawing Sheets

U.S. PATENT DOCUMENTS

| | | |
|---|---|---|
| 7,430,535 B2 * | 9/2008 | Dougherty et al. ............. 705/38 |
| 7,490,126 B2 * | 2/2009 | Ozzie et al. ................... 709/205 |
| 7,496,837 B1 * | 2/2009 | Larcheveque et al. ........ 715/237 |
| 2002/0065849 A1 * | 5/2002 | Ferguson et al. ............. 707/513 |
| 2002/0083092 A1 * | 6/2002 | Simpson ....................... 707/506 |
| 2003/0140095 A1 * | 7/2003 | Simpson et al. ............. 709/203 |
| 2004/0030995 A1 * | 2/2004 | Bhogal et al. ................ 715/523 |
| 2004/0139400 A1 * | 7/2004 | Allam et al. .................. 715/526 |
| 2004/0221233 A1 * | 11/2004 | Thielen ......................... 715/530 |
| 2004/0227968 A1 * | 11/2004 | Nakamura et al. ........... 358/1.13 |
| 2005/0002061 A1 * | 1/2005 | Uchida et al. ................ 358/1.18 |
| 2005/0125724 A1 * | 6/2005 | Peiro et al. ................... 715/517 |
| 2005/0134903 A1 * | 6/2005 | Tanimoto et al. ............ 358/1.15 |
| 2006/0031757 A9 * | 2/2006 | Vincent, III ................... 715/513 |
| 2006/0106822 A1 * | 5/2006 | Lee et al. ..................... 707/100 |
| 2007/0273936 A1 * | 11/2007 | Fujimaki ...................... 358/474 |

* cited by examiner

PREVIEWING A COMPOUND DOCUMENT

BACKGROUND OF THE INVENTION

Documents may have relationships with one or more other documents. A compound document is a document that references another document and a placed document is the document being referenced. A user performing changes on a placed document may desire a preview of the changes to the placed document that includes the compound document. Typically, this involves using the compound document application. However, this may be inconvenient for a user who is not familiar with the compound document application and may not be practical. Improved methods to display previews to users of placed documents would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
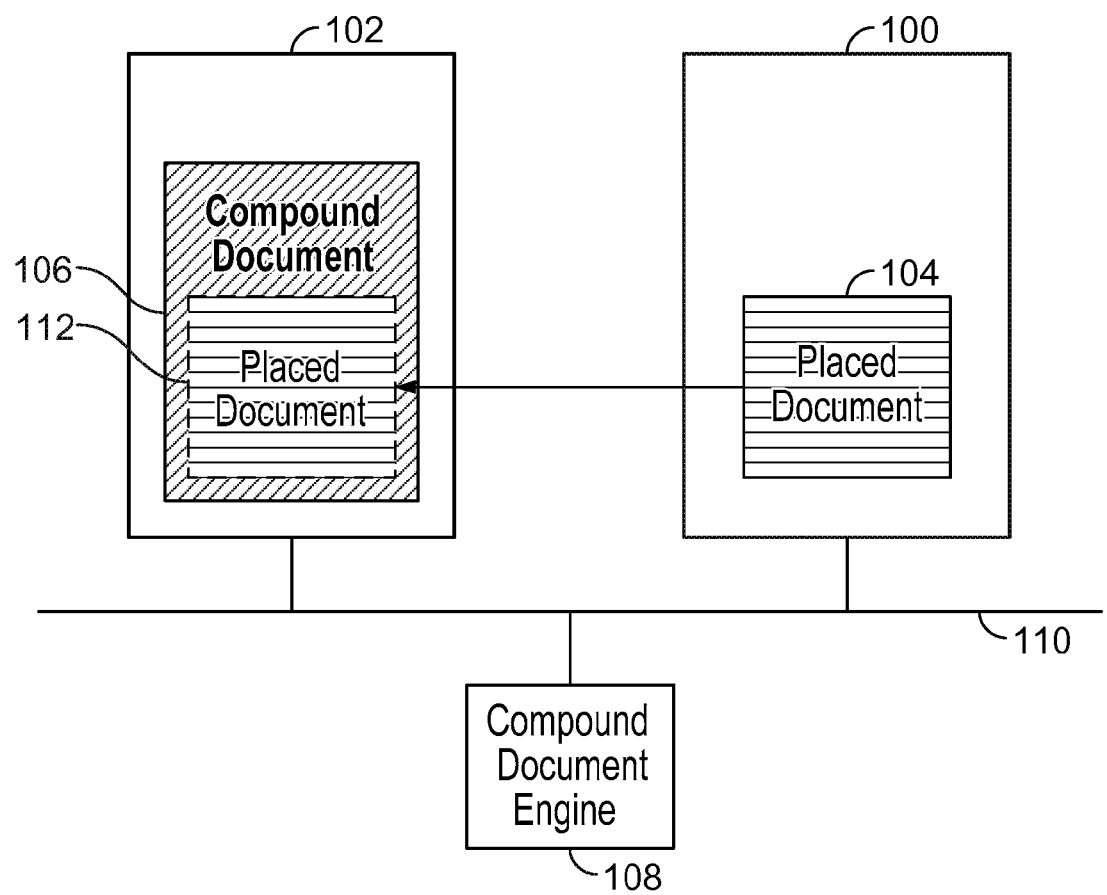
FIG. 1 is a block diagram illustrating an embodiment of a distributed system to preview a placed document in the context of a compound document.

FIG. 1 is a block diagram illustrating an embodiment of a distributed system to preview a placed document in the context of a compound document. In the example shown, placed document 104 is located on device 100. Placed document 104 is referenced by compound document 106 as placed document 112. In some embodiments, placed document 112 is a link that uniquely identifies placed document 104. For example, the file name and location of placed document 104 may be used as placed document 112. Placed document 112 may also be a pointer to a location in memory that contains placed document 104. A Universal Resource Locators (URL), Globally Unique Identifier (GUID), or Universally Unique Identifier (UUID) may also be used as placed document 112 to reference placed document 104. In some embodiments, placed document 112 is a copy of placed document 104. For example, an application that manages compound document 106 may periodically check placed document 104 for a newer version and copy any newer version to placed document 112. In this example, compound document 106 and placed document 104 are located remotely from each other on device 102 and device 100, respectively. Devices 100 and 102 are commonly accessible via network 110.

Placed document 104 and compound document 106 may include a variety of files, data structures, or multimedia content. For example, placed document 104 and compound document 106 may be an image, a video, a sound clip, a text document, or some combination of the above. In some embodiments, a document is a webpage and is identified by a URL. For example, compound document 106 may be a webpage (www.adobe.com) and placed document 104 may be an image (logo.gif) used in the webpage.

A variety of applications may be used to create, edit, and manage placed document 104 and compound document 106. For example, Adobe Pagemaker, Adobe InDesign, Adobe GoLive, Adobe Photoshop, Adobe Acrobat, and Adobe Illustrator may be used to create placed or compound documents. Other applications may also be used. For example, Microsoft Office (Word, Excel, FrontPage, Publisher, PowerPoint, etc.), QuarkXPress, QuarkCopyDesk, Apple QuickTime, Apple Final Cut, Apple Motion, Apple Logic, or Apple Shake may also be used. A placed document application may be installed on device 100. Similarly, a compound document application may be installed on device 102. In some embodiments, a user on device 100 does not have access to a compound document application. For example, a compound document application may not be installed on device 100 and the user may not be able to access a compound document application through network 110.

Compound document engine 108 is coupled to devices 100 and 102 via network 110. Compound document engine 108 is capable of generating a preview that includes compound document 106 and placed document 104. For example, a user on device 100 may update placed document 104 and would like to see a preview in the context of compound document 106. The preview may be a display of placed document 104 in the context of compound document 106. Compound document engine 108 generates a preview of compound document 106 that includes updates to placed document 104. This preview may be displayed to a user using a placed document application installed on device 100 or using another application installed on device 100. In some embodiments, the preview generated by compound document engine 108 includes updates to placed document 104 even though the updates are not saved. In some embodiments, the preview generated includes unsaved changes to the compound document.

In some embodiments, the preview generated by compound document engine 108 is in a format capable of being displayed by the placed document application. For example, the preview may be in the same format as placed document 104. In some embodiments, the preview is an image and is in a format capable of being displayed by the placed document application. A standardized format, such as Joint Photographic Experts Group (JPEG), Moving Picture Experts Group (MPEG), Tag Image File Format (TIFF), HyperText Markup Language (HTML), or Extensible Markup Language (XML) may be used. A proprietary format that the placed document application is capable of displaying may also be used. In some embodiments, another application installed on device 100 besides the placed document application is used to display the preview.

In some embodiments, applications installed on device 100 are not capable of displaying compound document 106. For example, the compound document application may not be installed on device 100 and the placed document application may not be able to decode compound document 106. The preview generated by compound document engine 108 is capable of being displayed even if the compound document application is not installed on device 100.

In some embodiments, a user of device 100 is not familiar with the compound document application. For example, the user may be an animator who is updating a video that is used in a webpage. The animator may have access to a webpage editing application but is more familiar with the video editing application. Since the placed document application (the video editing application) may be used to display the preview, a preview of the webpage including the video updates may be displayed even though the animator is not as familiar with the webpage editing application.

Devices 100 and 102 may include a variety of devices. In some embodiments, the devices are computers. In some embodiments, the devices have limited functionality and are used primarily for storage. For example, device 100 or 102 may be a storage drive or network accessible memory.

In some embodiments, compound document engine 108 generates multiple, independent previews. For example, compound document engine 108 may be accessible through the Internet. Data is transferred to and from compound document engine 108 using Internet protocols. Compound document engine 108 may interface simultaneously with multiple application streams. Previews are generated and managed independently for each application. In some embodiments, compound document engine 108 verifies identification before generating a preview. A key, certificate, or other secured access mechanism may be used so that only authorized users may utilize compound document engine 108. In some embodiments, compound document engine 108 maintains records associated with generating previews. For example, the compound document engine may record which user requested a preview to be generated, the number of times a preview is generated for a particular document, or the format of the placed document or compound document. In some embodiments, these records are used to assess fees based on usage of compound document engine 108.

A variety of wired or wireless networks may be used to implement network 110. In some embodiments, network 110 is a wireless network. For example, IEEE 802.11 or Bluetooth may be used as the network. In some embodiments, a wired network is used, such as an Ethernet network. In some embodiments, the system is not distributed and network 110 is not used. For example, compound document 106, placed document 104, and compound document engine 108 may be located on the same device. Compound document engine 108 may be included in the placed document application and installed with the placed document application. In some embodiments, some components are located remotely and some components are co-located. For example, compound document engine 108 may be included in the placed document application and installed on device 100. However, compound document 106 may be located remotely on device 102 which is accessible via network 110.

Figure 2:
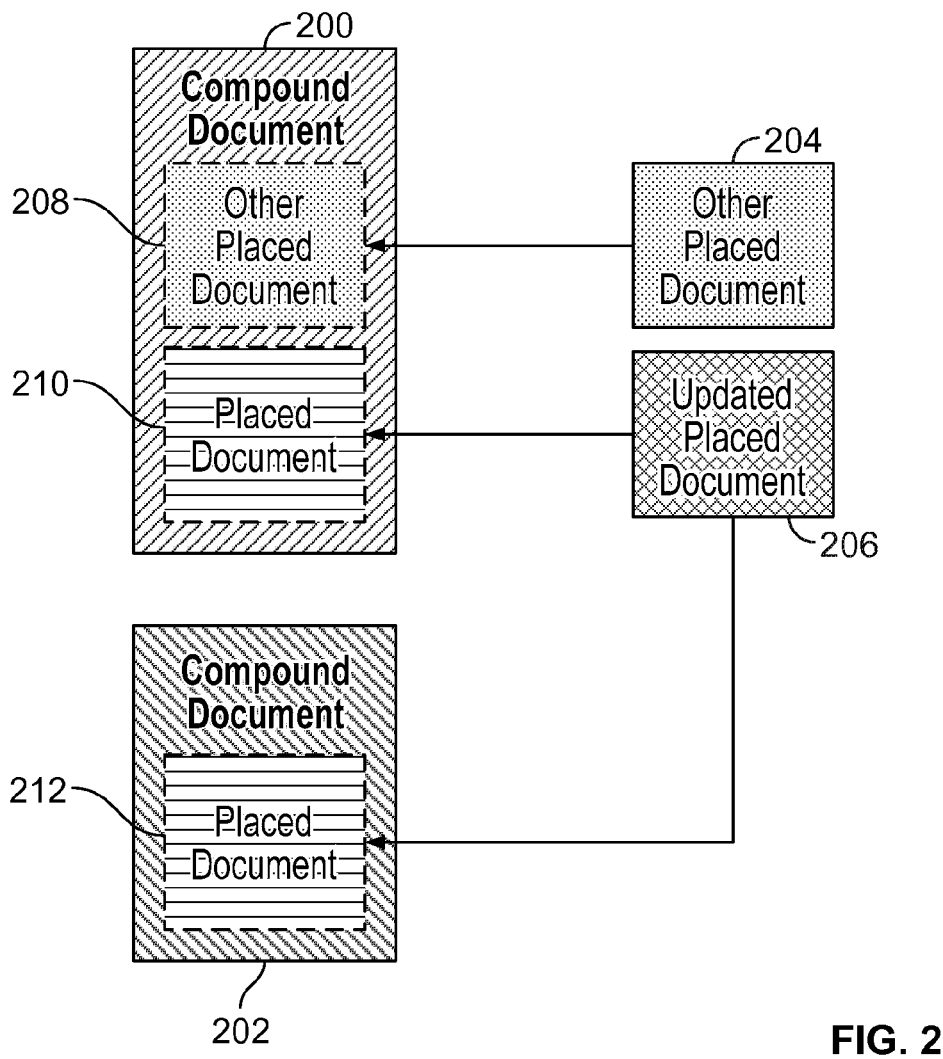
FIG. 2 is diagram illustrating an embodiment of an updated placed document and other documents related to it.

FIG. 2 is diagram illustrating an embodiment of an updated placed document and other documents related to it. In the example shown, updated placed document 206 is updated. Two compound documents 200 and 202 reference updated placed document 206 as placed documents 210 and 212, respectively. In this example, the changes to updated placed document 206 have not been saved. Therefore, placed documents 210 and 212 in the compound documents do not necessarily include some changes to updated placed document 206. As illustrated, more than one compound document may reference a placed document.

Similarly, a compound document may reference more than one placed document. In addition to placed document 210, compound document 200 also includes other placed document 208 that references other placed document 204. In some embodiments, a compound document contains multiple references to the same placed document. For example, compound document 200 may contain two references to updated placed document 206. In some embodiments, there may be a chain of documents that reference each other. For example, compound document 200 may also be a placed document referenced by another compound document. Placed document 210 may also be a compound document that references another placed document. One document may reference another document, which references another document, and so on. As described in further detail below, a preview may include all related documents or may include a subset of related documents.

A preview(s) of compound documents 200 and 202 is generated. In some embodiments, the preview includes all changes to updated placed document 206 even though some changes are not saved. In some embodiments, a user selects which previews are generated. For example, a popup window may be presented to the user. The user checks the box next to the compound document(s) the user would like to preview. In some embodiments, the user is allowed to select the scope of the preview. For example, the user may desire to see a preview of compound document 200 with updated placed document 206 but without other placed document 204. In some embodiments, compound document 200 is a placed document referenced by a higher level compound document. The user may choose to generate a preview that includes the higher level compound document, compound document 200, and updated placed document 206. Alternatively, the user may select a preview that includes only compound documents one level of hierarchy above the placed document of interest, such as compound document 200 of the preceding example.

Figure 3:
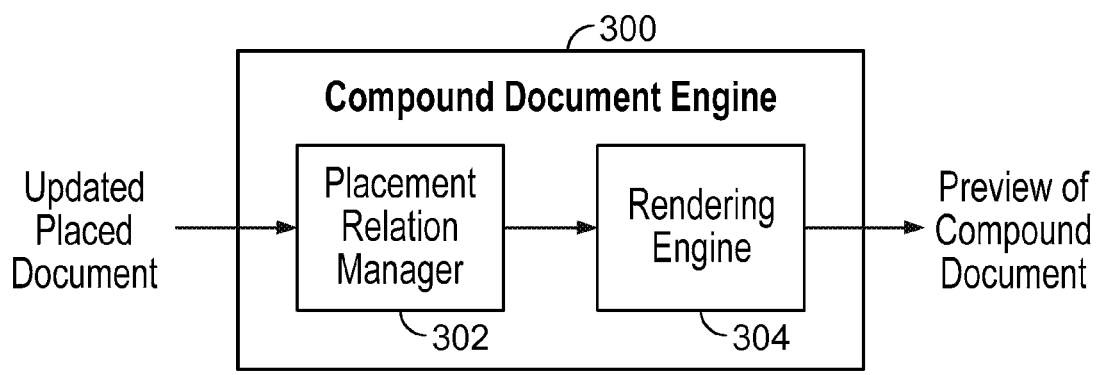
FIG. 3 is a block diagram illustrating an embodiment of a compound document engine.

FIG. 3 is a block diagram illustrating an embodiment of a compound document engine. In the example shown, compound document engine 300 includes placement relation manager 302. An updated placed document is passed to placement relation manager 302, which is coupled to rendering engine 304. Rendering engine 304 generates a preview of a compound document that includes the updated placed document.

Placement relation manager 302 manages references between compound documents and placed documents. For example, placement relation manager 302 may maintain a list of which compound documents reference which placed documents. If a new reference to a placed document is created, a new record may be added to the list. Similarly, changes and deletions to the list may also be managed. Using such a list, placement relation manager 302 may determine which compound documents reference a specific updated placed document, as well as any other placed documents those compound documents also reference or are referenced by. For example, updated placed document 206 may be passed to placement relation manager 302. Placement relation manager determines that compound documents 200 and 202 reference updated placed document 206. Compound documents 200 and 202 are located and obtained. Placed document 208 in compound document 200 is determined and placed document 204 is obtained.

Rendering engine 304 generates a preview in a format capable of being displayed by a placed document application. For example, previews of compound documents 200 and 202 that include updated placed document 206 may be output by rendering engine 304. Temporary copies of compound documents 200 and 202 with updated placed document 206 may be passed from placement relation manager 302 to rendering engine 304. Using these temporary copies, rendering engine 304 generates the previews. In some embodiments, instead of passing a temporary copy to rendering engine 304, a list is passed to rendering engine 304. Rendering engine 304 may use the list to obtain the compound documents and placed documents used to generate the preview.

In some embodiments, generation of the preview is transparent to a user of the compound document. For example, while a preview of the compound document (which includes the updated placed document) is generated, another user may be editing the compound document. Although a preview is being generated, the other user editing the compound document is unaware of this. In some embodiments, the updated placed document is not saved. The other user editing the compound document is presented with the last saved version of the placed document. Once the updated placed document is saved, the other user is presented with the updates at an appropriate point determined by the compound document application. For example, the other user may receive a popup window notifying the user that a newer version of the placed document is available, or the compound document application may automatically present the newer version of the placed document.

A variety of methods may be used to control the version of the compound document a user editing the placed document views. In one example, users are performing changes on the compound document and the placed document in parallel. The user of the placed document may not wish to see every intermediate change of the compound document since the compound document may be saved quite frequently. The user of the placed document may continually view the version of the compound document he began his session with. Alternatively, the version of the compound document presented to a user of the placed document may be updated. Some examples are: updates are manually triggered (the user of the placed document manages updating the compound document used to generate the preview), updates are automatic (an application manages updating the compound document used to generate the preview), or updates are periodic (an application manages updating the compound document used to generate the preview).

In some embodiments, components in addition to or in place of those described are used. For example, if the documents are located remotely on a storage device, an interface may be used to retrieve the documents from the storage device. Compound document engine 300 may generate previews for many users and a controller may be used to manage this. An application interface may be used to manage communication with the placed document application and other applications. These are some examples of other components that may be used.

Figure 4:
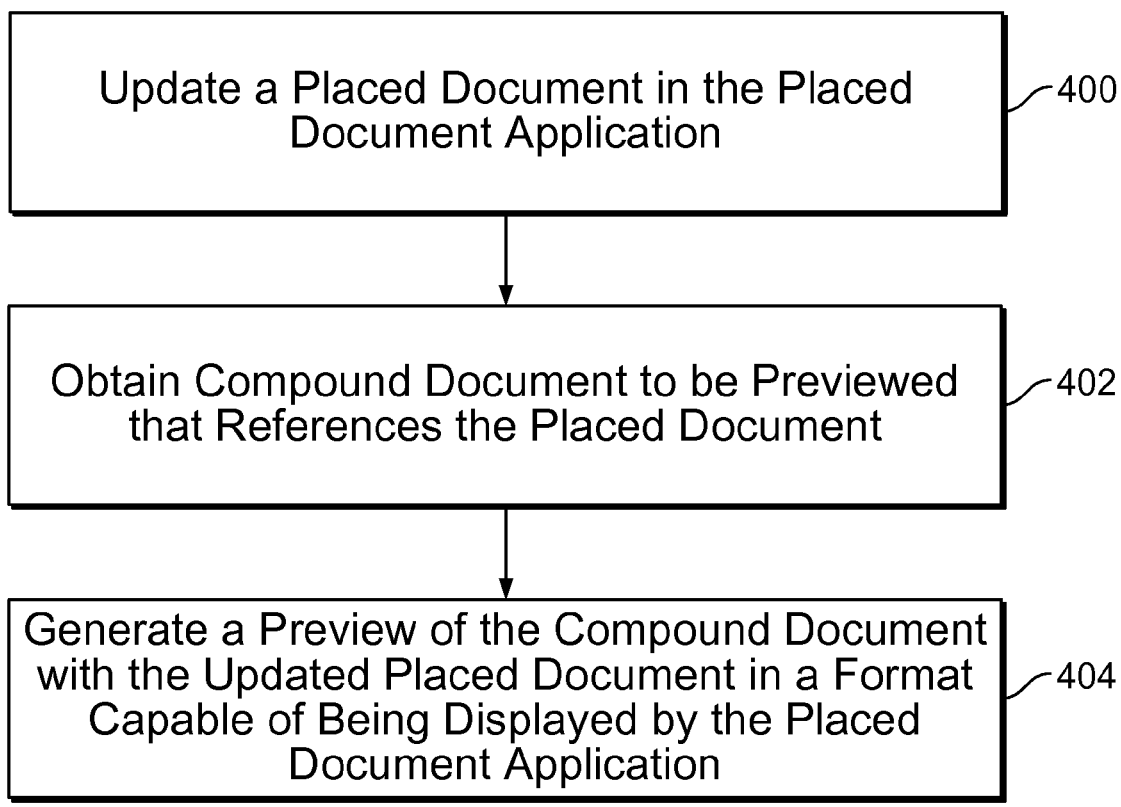
FIG. 4 is a flowchart illustrating an embodiment of generating a preview of an updated placed document in the context of a compound document.

FIG. 4 is a flowchart illustrating an embodiment of generating a preview of an updated placed document in the context of a compound document. In the example shown, the placed document is updated in the placed document application at 400. For example, the update may be performed by a user who desires a preview of the compound document which includes the update to the placed document. In some embodiments, the updates to the placed document have not been saved.

At 402, a compound document to be previewed that references the placed document is obtained. For example, this may be performed by a device such as compound document engine 108. In some embodiments, more than one compound document references the updated placed document and all compound documents are obtained. In some embodiments, the user selects which compound documents are previewed. The compound document may also reference other placed documents in addition to the updated placed document. Other placed documents that are referenced by the compound documents to be previewed may also be obtained.

A preview of the compound document with the updated placed document in a format capable of being displayed by the placed document application is generated at 404. For example, a preview of compound document 200 with updated placed document 206 and other placed document 204 may be generated. Compound document 200 references updated placed document 206 and other placed document 204. The formats of compound document 200, updated placed document 206, and other placed document 204 may be different and a placed document application may not be able to decode all of the formats. A conversion into a format the placed document application is capable of displaying may be performed. The format may be a format defined by a standard, such as JPEG or TIF. The format may be the same format as the updated placed document. The format may even be a format that is not one of the formats of the documents used to generate the preview.

In some embodiments, a look up table is used to determine parameters associated with the preview. For example, a lookup table may be used to determine the format or the resolution of a preview. The placed document application, the compound document application, user preferences, or available bandwidth may be used to organize the contents of the lookup table. In one example, the format of the preview may be based on the placed document application. One placed document application may result in a preview in a certain format while another placed document application may result in a different format. In another example, the lookup table is based on the bandwidth available to transfer the preview. For example, if a limited amount of bandwidth is available for transmission, the lookup table may be configured to select a high compression format and/or low image resolution for the preview. This may be useful in reducing the bandwidth used to transfer the preview. In some embodiments, the contents of the lookup table are used as defaults. The defaults may be overridden by the user or the placed document application.

Figure 5:
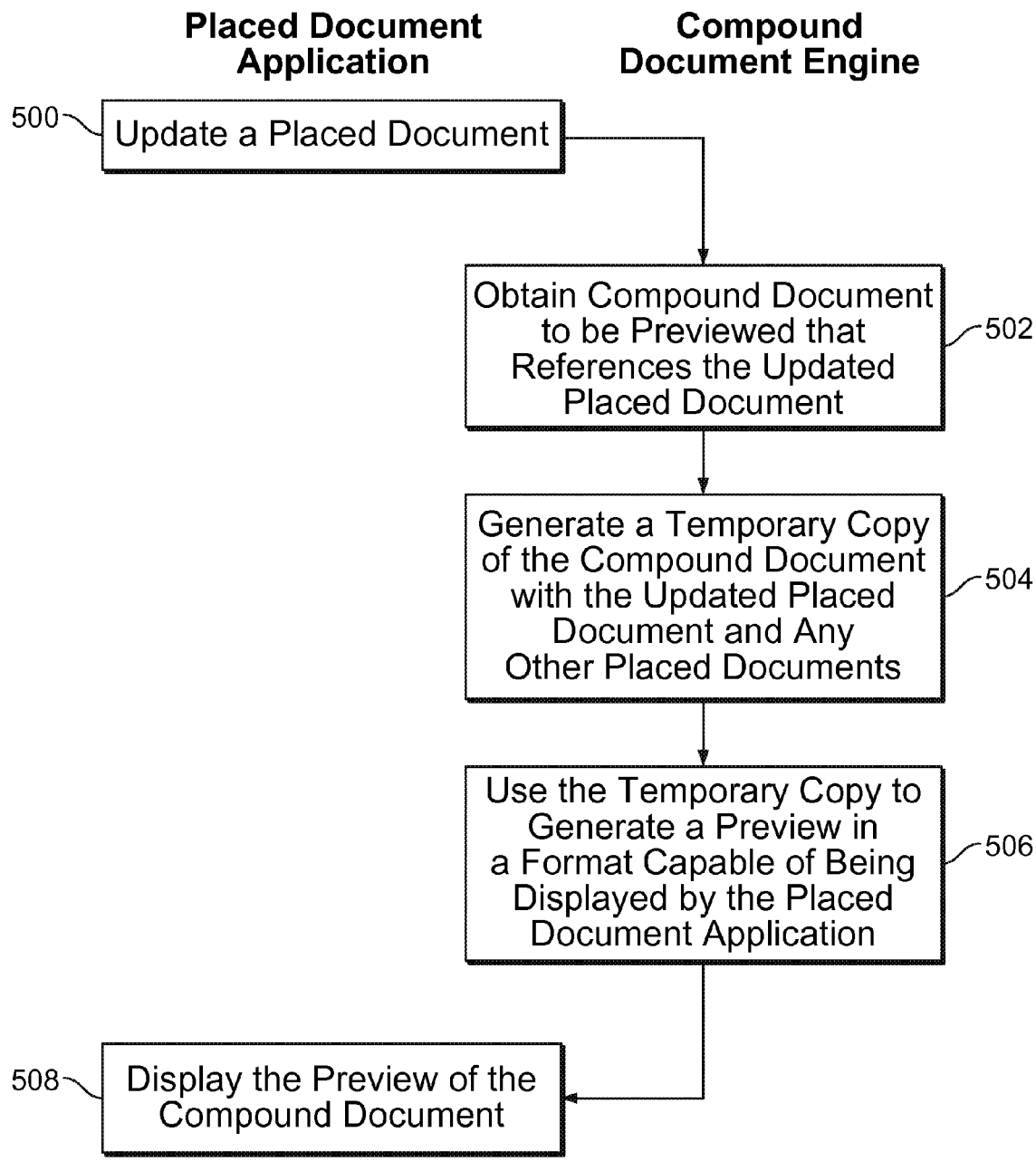
FIG. 5 is a flowchart illustrating an embodiment of generating a preview by creating a temporary copy.

FIG. 5 is a flowchart illustrating an embodiment of generating a preview by creating a temporary copy. In the example shown, steps are associated with a placed document application or a compound document engine. In some embodiments, the placed document application and the compound document engine are located remotely from each other. For example, they may be located on different devices that are commonly accessible via a network. In some embodiments, the placed document application and the compound document engine are co-located. For example, they may be installed on the same computer.

A placed document is updated using a placed document application at 500. A user may use an image editing application to change a digital image. The user would like to see a preview of the updated image as it is used in a webpage that references it. The webpage in this example is a compound document; there may also be other compound documents in addition to the webpage that reference the image.

In some embodiments, the user manually triggers a preview to be generated. For example, the user may select a button in the placed document application to generate a preview. In some embodiments, the user does not need to explicitly command the placed document application to generate a preview. For example, certain commands may be coupled to generating a preview. Saving the image or other commands may trigger a preview to be generated without any additional interaction by the user. In some embodiments, the preview is generated on a time driven basis. For example, the preview may be generated on a periodic basis. In another example, the preview generated is in real time. As soon as an update is made to the placed document, it is correspondingly represented in the displayed preview.

The compound document to be previewed that references the updated placed document is obtained at 502. In some embodiments, an entity (such as a placement relation manager) tracks references between compound documents and placed documents. For example, the placement relation manager may be passed the updated placed document or a unique identifier associated with the updated placed document. The placement relation manager determines compound documents that reference the updated placed document. In some embodiments, a preview is generated for all compound documents that reference the updated placed document. In some embodiments, previews are generated for only some of the compound documents. The user may be queried to determine for which compound documents to generate previews.

In some embodiments, a compound document to be previewed contains references to other placed documents and the other placed documents are obtained. Obtaining the other placed document may involve the same methods and devices used to obtain the compound documents.

A temporary copy of the compound document with the updated placed document and any other placed documents is generated at 504. The temporary copy may be managed by the compound document engine. When the preview is initially generated, the compound document engine creates a new temporary copy. After the temporary copy is created, the compound document may update the existing temporary copy if another preview of the same compound document is triggered. If the placed document application sends a termination signal to the compound document engine, the temporary copy may be deleted.

In some embodiments, a temporary copy of the compound document with the updated placed document is not created. For example, the compound document engine may operate directly on and manage edits to the compound document. A reference to the placed document may be (temporarily) replaced with a reference to the updated placed document. In another example, references to placed documents are adjusted on the fly. The compound document is read from memory and passed as a stream to a rendering engine. As references to placed documents in the compound document are read they are substituted out and references to updated placed documents are instead passed to the rendering engine. In some embodiments, the compound document engine determines whether or not to create a temporary copy. Considerations such as simultaneous access of the compound document by another user, the amount of memory needed to create a temporary copy, and available memory may be used to determine which method to use.

The temporary copy is used to generate a preview in a format capable of being displayed by the placed document application at 506. In some embodiments, this step is not performed since the temporary copy is in a format capable of being displayed by the placed document application. In some embodiments, the temporary copy is not in a format capable of being displayed by the placed document application. The compound document engine may then convert the format. At 508, the preview of the compound document is displayed by the placed document application.

In some embodiments, the placed document application is not capable of displaying the compound document. Since the preview is in a format capable of being displayed by the placed document application, the user is not required to have access to additional applications. In some embodiments, a user updating a placed document primarily uses the placed document application and has limited experience with other applications. By generating a preview as described, the user is not required to learn another application in order to view a preview of the compound document with the updated placed document. Generation of the preview may also be transparent to other users who are accessing the compound document if a temporary copy is used to generate the preview.

In some embodiments, other methods are used to generate the preview. For example, in some embodiments, a temporary copy may not be used because of the size of the compound document or available memory. A variety of methods and techniques may be used to generate a preview besides those described in the previous example.

Figure 6:
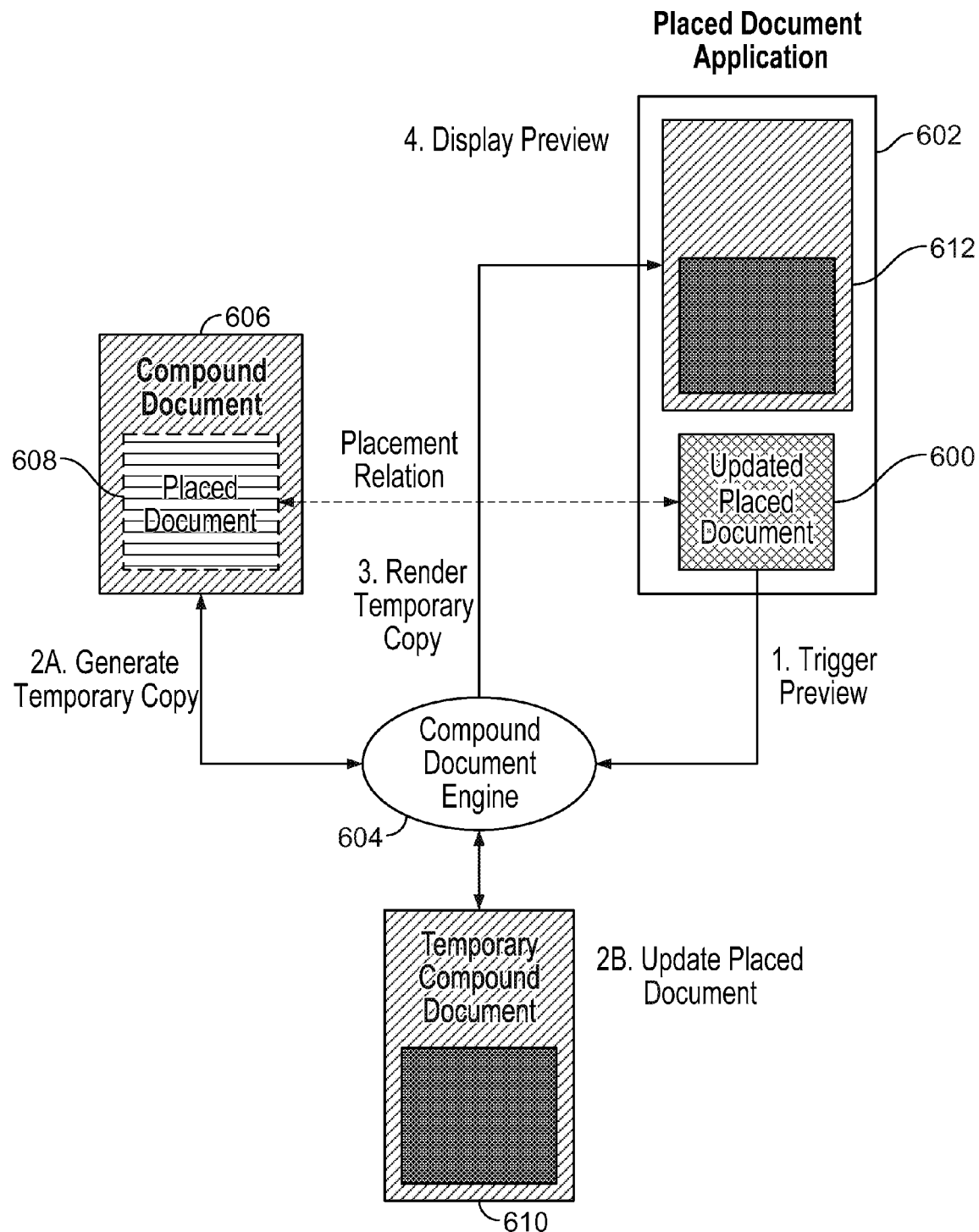
FIG. 6 is a diagram illustrating an embodiment of generating and displaying a preview.

FIG. 6 is a diagram illustrating an embodiment of generating and displaying a preview. In the example shown, updated placed document 600 is updated using placed document application 602. Placed document application 602 optionally signals to compound document engine 604 to trigger a preview. Compound document engine 604 determines that compound document 606 includes placed document 608, which has a placement relation with updated placed document 600. In some embodiments, placed document 608 references an older version of updated placed document 600. Temporary compound document 610 is created using compound document 606 and updated placed document 600. Compound document engine 604 uses temporary copy 610 to render a preview of the compound document. Preview 612 that is rendered by compound document engine 604 is displayed using placed document application 602.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method comprising:
 providing access to a first document via a first application, wherein a second document includes the first document such that in the event the second document is displayed, content from the first document is also displayed;

receiving an unsaved edit to the first document prior to generating a preview of the second document, wherein the preview includes the unsaved edit to the first document;

generating the preview of the second document that includes (1) content from the first document and (2) graphical content included in the second document and not included in the first document, wherein the preview is in a format capable of being displayed by the first application and generating the preview of the second document includes:

using a processor to access the second document from memory to obtain a data stream;

using the processor to substitute a reference to the first document not having the unsaved edit with a reference to the first document having the unsaved edit by manipulating the data stream on-the-fly before the data stream is input by a rendering engine; and providing to the rendering engine the manipulated data stream with the reference to the first document not having the unsaved edit substituted out and the reference to the first document having the unsaved edit substituted in; and providing, via the first application, the preview of the second document that includes content from the first document and the graphical content included in the second document and not included in the first document.

2. A method as recited in claim 1, wherein a second application is associated with the second document.

3. A method as recited in claim 1 further including receiving an edit to the first document, wherein the edit to the first document is not saved.

4. A method as recited in claim 1 further including receiving an edit to the first document, wherein the edit to the first document is performed using the first application.

5. A method as recited in claim 1, wherein the first document includes an image.

6. A method as recited in claim 1, wherein the second document includes a webpage and/or references the first document using a URL.

7. A method as recited in claim 1, wherein the format capable of being displayed by the first application includes a format associated with the first document.

8. A method as recited in claim 1, wherein a plurality of second documents reference the first document and a preview for at least one of the plurality of second documents is generated.

9. A method as recited in claim 1, wherein the second document further references a third document and the preview includes the third document.

10. A method as recited in claim 1, wherein:
the first document is a placed document;
the second document is a compound document where a compound document includes content from at least one placed document; and
the method further comprises:
tracking one or more references between one or more compound documents and one or more placed documents; and
automatically determining, using the tracked references, those compound documents that include content from the first document.

11. A method as recited in claim 1, wherein generating the preview of the second document further includes:
determining whether to create a temporary copy of the second document that includes the first document having the unsaved edit;

in the event it is determined to create a temporary copy of the second document, creating a temporary copy of the second document that includes the first document having the unsaved edit; and in the event it is determined to not create a temporary copy of the second document, not creating a temporary copy of the second document that includes the first document having the unsaved edit.

12. A method as recited in claim 11, wherein determining is based at least in part on simultaneous access of the second document by another user.

13. A method as recited in claim 1, wherein generating the preview of the second document does not include creating a temporary copy of the second document that includes the first document having the unsaved edit.

14. A system for providing a preview comprising:
an interface configured to:
provide access to a first document via a first application, wherein a second document includes the first document such that in the event the second document is displayed, content from the first document is also displayed;
receive an unsaved edit to the first document prior to generating a preview of the second document, wherein the preview includes the unsaved edit to the first document; and
provide, via the first application, a preview of the second document that includes content the first document and graphical content included in the second document and not included in the first document; and a processor configure to generate the preview of the second document that includes (1) content from the first document and (2) graphical content included in the second document and not included in the first document, wherein the preview is in a format capable of being displayed by the first application and generating the preview of the second document includes:
accessing the second document from memory to obtain a data stream;
substituting a reference to the first document not having the unsaved edit with a reference to the first document having the unsaved edit by manipulating the data stream on-the-fly before the data stream is input by a rendering engine; and
providing to the rendering engine the manipulated data stream with the reference to the first document not having the unsaved edit substituted out and the reference to the first document having the unsaved edit substituted in.

15. A system as recited in claim 14, wherein the format capable of being displayed by the first application includes a standardized format.

16. A system as recited in claim 14, wherein:
the first document is a placed document;
the second document is a compound document where a compound document includes content from at least one placed document; and
the processor is further configured to:
track one or more references between one or more compound documents and one or more placed documents; and
automatically determine, using the tracked references, those compound documents that include content from the first document.

17. A system as recited in claim 14, wherein generating the preview of the second document further includes:

determining whether to create a temporary copy of the second document that includes the first document having the unsaved edit;

in the event it is determined to create a temporary copy of the second document, creating a temporary copy of the second document that includes the first document having the unsaved edit; and in the event it is determined to not create a temporary copy of the second document, not creating a temporary copy of the second document that includes the first document having the unsaved edit.

18. A system as recited in claim 17, wherein determining is based at least in part on simultaneous access of the second document by another user.

19. A system as recited in claim 14, wherein generating the preview of the second document does not include creating a temporary copy of the second document that includes the first document having the unsaved edit.

20. A computer program product, the computer program product being embodied in a non-transitory computer readable storage medium and comprising computer instructions for:

providing access to a first document via a first application, wherein a second document includes the first document such that in the event the second document is displayed, content from the first document is also displayed receiving an unsaved edit to the first document prior to generating a preview of the second document, wherein the preview includes the unsaved edit to the first document;

generating a preview of the second document that includes (1) content from the first document and (2) graphical content included in the second document and not included in the first document, wherein the preview is in a format capable of being displayed by the first application and generating the preview of the second document includes:

accessing the second document from memory to obtain a data stream;

substituting a reference to the first document not having the unsaved edit with a reference to the first document having the unsaved edit by manipulating the data stream on-the-fly before the data stream is input by a rendering engine; and providing to the rendering engine the manipulated data stream with the reference to the first document not having the unsaved edit substituted out and the reference to the first document having the unsaved edit substituted in; and providing, via the first application, the preview of the second document that includes content from the first document and graphical content included in the second document and not included in the first document.

21. A computer program product as recited in claim 20, wherein the format capable of being displayed by the first application includes a standardized format.

22. A computer program product as recited in claim 20, wherein:

the first document is a placed document;

the second document is a compound document where a compound document includes content from at least one placed document; and the computer program product further includes computer instructions for:

tracking one or more references between one or more compound documents and one or more placed documents; and automatically determining, using the tracked references, those compound documents that include content from the first document.

23. A computer program product as recited in claim 20, wherein generating the preview of the second document further includes:

determining whether to create a temporary copy of the second document that includes the first document having the unsaved edit;

in the event it is determined to create a temporary copy of the second document, creating a temporary copy of the second document that includes the first document having the unsaved edit; and in the event it is determined to not create a temporary copy of the second document, not creating a temporary copy of the second document that includes the first document having the unsaved edit.

24. A computer program product as recited in claim 23, wherein determining is based at least in part on simultaneous access of the second document by another user.

25. A computer program product as recited in claim 20, wherein generating the preview of the second document does not include creating a temporary copy of the second document that includes the first document having the unsaved edit.

* * * * *